Patented Apr. 25, 1950

2,505,204

UNITED STATES PATENT OFFICE 2,505,204

VINYLTHIOPHENE POLYMERIZATION PROCESS AND PRODUCTS

Edgar C. Pitzer, Baltimore, Md., assignor to Standard Oil Company, Chicago, Ill., a corporation of Indiana No Drawing. Application September 24, 1943, Serial No. 503,651

22 Claims. (Cl. 260—79.7)

This invention relates to the production of novel polymerization products. More particularly, it relates to a process for the preparation of conjoint polymerization products of a vinylthiophene and polymerizable unsaturated organic compounds.

An object of my invention is to provide new and useful high molecular weight polymerization products. Another object of my invention is to provide a novel and useful process for the preparation of novel highly polymeric products. A further object of my invention is to provide rubber-like materials from a vinylthiophene and at least one copolymerizable unsaturated compound. An additional object of my invention is to produce plastic materials from a vinylthiophene and at least one copolymerizable unsaturated compound. Yet another object of my invention is to provide a condensation or polymerization process in which vinylthiophene is one of the reacting ingredients. Additional objects of my invention will become apparent as the description thereof proceeds.

I have found that vinylthiophenes can be polymerized with a wide variety of unsaturated organic compounds to produce high molecular weight products varying in nature from resinous or plastic materials to rubber-like materials, depending on the substance with which the vinylthiophene is polymerized and depending on the polymerization conditions adopted. Either 2-vinylthiophene or 3-vinylthiophene can be employed in my invention.

Suitable classes of substances for copolymerization with a vinylthiophene include mono-olefinic compounds, non-conjugated poly-olefinic compounds, conjugated polyolefinic compounds, acetylenic compounds or mixtures of two or more co-monomers selected from these classes.

By mono-olefinic compounds I mean to denote mono-olefin hydrocarbons, or other compounds containing one olefinic double bond and one or more additional functional groups in the molecule. Examples of suitable mono-olefinic compounds include hydrocarbons such as propylene, 1-butene, 2-butene, isobutylene, cyclohexene, alkyl substituted cyclohexenes; vinyl substituted heterocyclic compounds, e. g., furylethylene and vinyl pyridine; vinyl substituted aromatic compounds such as styrene, alpha-alkylstyrenes, alkoxy substituted styrenes, vinyl naphthalenes; olefinic acetylenes, such as vinyl acetylene, divinyl acetylene and the like; halogenated compounds such as vinyl chloride, vinylidene chloride, vinyl bromide, allyl chloride, methallyl chloride, 3,4-dichlorobutene-1; mono-olefinic nitriles such as acrylonitrile and methcrylonitrile; esters of unsaturated acids, such as acrylic, methacrylic, crotonic and the maleic and fumaric acids; esters of unsaturated alcohols, such as allyl, methallyl and crotonyl alcohols; vinyl esters, such as vinyl acetate, vinyl propionate, vinyl butyrate, vinyl benzoate and the like; ethers, such as methyl vinyl ether, ethyl vinyl ether, butyl vinyl ether, phenyl vinyl ether, benzyl vinyl ether and the like; unsaturated ketones, such as methyl vinyl ketone, etc.

By non-conjugated polyolefinic compounds I mean to denote non-conjugated di, tri- or higher olefin hydrocarbons, or compounds containing two or more non-conjugated olefinic double bonds and one or more additional functional groups in the molecule. Examples of suitable comonomeric non-conjugated polyolefinic compounds include hydrocarbons such as allene, 1,2-butadiene, 1,2-pentadiene, 2,3-pentadiene, 1,4-pentadiene, 1,2-hexadiene, 1,4-hexadiene, 1,5-hexadiene, 2,3-hexadiene, etc.; hydrocarbons such as 6-methyl-1,2,5-heptatriene, 5-ethyl-1,4,8-nonatriene, and the like; divinyl benzenes and divinyl naphthalenes; fatty acids, such as 9,12-octadecadiene carboxylic acid and esters thereof, e. g. methyl, ethyl, propyl, butyl esters and the like. I can likewise use non-conjugated polyolefinic nitriles, alcohols, halides, ethers, etc.

By conjugated polyolefinic compounds I mean to denote conjugated di-, tri- or higher olefin hydrocarbons, or compounds containing two or more conjugated olefinic double bonds and one or more additional functional groups in the molecule. Examples of suitable conjugated polyolefinic compounds include hydrocarbons such as 1,3-cyclopentadiene, methylcyclopentadienes, cyclohexadiene 1,3 and indene; 1,3-butadiene, hydrocarbons containing the 1,3-butadiene carbon skeleton, e. g. isoprene, 2,3-dimethyl butadiene-1,3, 1,2-dimethylbutadiene-1,3, 2-methylpentadiene-1,3, 2-phenylbutadiene-1,3, 2-benzylbutadiene-1,3, piperylene, hexadiene-2,4, 2-methylhexadiene-2,4, 2,4-dimethylpentadiene-2,4, 2-butyl butadiene-1,3, 2-n-heptyl-butadiene-1,3; hydrocarbons such as 1,3,5-hexatriene, 1,3,5-heptatriene, 1,3,6-heptatriene, 2,4,6-octatriene, 2-methyl-2,4,6-heptatriene, ocimene, allo-ocimene, myrcene, 1,5,7-octatriene-3-yne and the like; conjugated fatty acids and esters such as are produced for example, by dehydration of castor oil fatty acids and esters, isomerization of soybean, linseed and tung oil fatty acids and esters by means of aqueous or alcoholic alkali metal hydroxides or otherwise, particularly the conjugated octadecatrienoic acids and esters; esters of conjugated polyolefinic alcohols, e. g. formate, acetate, propionate, butyrate, etc. of 1,3-butadienyl alcohol; halogen compounds such as 2-chlorobutadiene-1,3, 2-bromo-butadiene-1,3, 2-iodo-butadiene-1,3, 2-chloro-3-methyl-butadiene-1,3; nitriles, such as 2-cyano-butadiene-1,3, 2-cyano-3-methyl-butadiene-1,3 and 4-cyano-butadiene-1,3; ethers, such as the oxyprenes 2-methoxy-butadiene-1,3, 2-ethoxy-butadiene-1,3, 2-butoxy-butadiene-1,3, 2-phenoxy-butadiene-1,3 and the like.

By acetylenic compounds I intend to denote acetylenic hydrocarbons, or compounds containing an acetylene linkage and one or more additional functional groups in the molecule. Examples of suitable acetylenic hydrocarbons are butine-1, butine-2, vinyl acetylene, divinyl acetylene, dipropargyl, diacetylene, ethynylbutadiene, 1,5,7-octatriene-3-yne, p-diethynylbenzene; alcohols such as vinyl ethynyl carbinols, etc.; furylacetylene, etc.

It is not intended to imply exact equivalency in behavior between comonomers chosen from the several classes described above or even, necessarily, between different comonomers chosen from the same class. However, useful copolymers can be obtained from all of the classes and species of comonomers detailed above.

The relative proportions of vinylthiophene and monomeric unsaturated compound can usually be varied over a wide range, e. g. the vinylthiophene can range from about 5% to as much as 90%, and generally from about 10% to 50% based on the reacting ingredients.

Emulsion polymerization offers a very suitable method for the production of high molecular weight polymeric materials from vinylthiophene and suitable comonomeric compounds. In emulsion polymerization, the feed to be polymerized is emulsified in an immiscible inert liquid, usually water, containing an emulsifying agent and a polymerization catalyst and polymerization is caused to occur in the emulsified droplets of the feed stock. Emulsion polymerization offers several advantages over mass polymerization, e. g. the heat generated during polymerization is readily dissipated in the inert liquid which forms the continuous phase. Higher molecular weight polymerization products are frequently obtainable, polymerization proceeds at a higher rate, polymerization can be readily carried out at a lower temperature, and a synthetic latex product is obtained.

A wide variety of emulsifying agents can be used to disperse a vinylthiophene and one or more desired comonomers in an aqueous medium containing a suitable polymerization catalyst. Suitable emulsifying agents can comprise alkali metal salts of the higher fatty acids, e. g. sodium oleate or stearate, salts of sulfated higher alcohols, e. g. sodium lauryl sulfate and sodium cetyl sulfate, soaps of alkyl aromatic sulfonic acids, such as sodium soaps of alkyl benzene sulfonic acids containing about 12 to about 16 carbon atoms in the alkyl group, sodium salts of propylated or butylated naphthalene sulfonic acids, etc., Turkey red oils, alpha-hydroxyoctadecane sulfonic acid, cetyl p-dimethylaminobenzoate methosulfate, higher amine salts such as dodecylamine hydrochloride, octadecylamine sulfate, triethanolamine oleate, etc. The emulsion can also be stabilized by the addition of protective colloids such as casein, gelatin, starch, dextrin, saponin and the like. Electrolytes such as acetic acid and sodium chloride, and buffers can also be added to the emulsion.

It is preferred to use oxygen-disengaging polymerization catalysts in the emulsion polymerization. Suitable catalysts include oxygen, hydrogen peroxide, sodium peroxide, persulfates, e. g. persulfates of sodium, potassium or ammonium, percarbonates, organic peroxides, e. g. benzoyl peroxide, peracetic acid, methyl tetrahydrofurane peroxides, aldehyde and ketone peroxides and the like. In general, I can use about 0.01 to about 10 weight per cent of a soluble peroxide polymerization catalyst. The course of the polymerization reaction may be controlled and the extent of polymerization regulated by the addition of small proportions of compounds such as ethyl or higher mercaptans, diisopropyl or diisobutyl xanthogen disulfides, ditolydisulfide, carbon tetrachloride, hexachloroethane, and trichloropropionitrile.

Emulsion polymerization can be satisfactorily carried out at a temperature in the range of about 50° to about 200° F., preferably at about 80° to about 160° F.

Depending on the composition of the particular feed stock, the specific polymerization conditions selected and the extent of polymerization, the time allowed for polymerization can vary from a few hours, e. g. three hours, to a period of several days, e. g., as much as ten days. High pressure is not required for polymerization and generally only sufficient pressure is employed to keep the reactants in the liquid phase. Pressures of about 100 to 500 lbs./sq. in. are usually sufficient.

The following examples are adduced for the purpose of illustrating my invention and are not to be construed in limitation thereof. All parts are by weight.

*Example 1*

An emulsion was prepared by mixing 5 parts of 2-vinylthiophene and 15 parts of 1,3-butadiene with 100 parts of water containing 2 parts of sodium oleate and 0.1 part of benzoyl peroxide. The emulsion was maintained at a temperature between about 120° and 125° F. for 88 hours under autogenous pressure, at which time 0.6 part of phenyl - beta - naphthylamine antioxidant was added and the resultant latex was coagulated by the addition of acetic acid. The coagulation yielded a rubber-like product which was soluble in benzene.

*Example 2*

An emulsion was prepared by mixing 13 parts of 2-vinylthiophene and 37 parts of 1,3-butadiene with 90 parts of water containing 10 parts of sodium oleate, 0.2 part of sodium peroxide, and, as a polymerization regulator, 0.2 part of ethyl mercaptan. The emulsion was maintained at a temperature between about 120° and 125° F. for a period of 91 hours in a pressure vessel. Then 1.5 parts of phenyl-beta-naphthylamine antioxidant were added. Precipitation of the synthetic latex copolymerization product yielded 46 parts of a rubbery coagulum which was washed with water and then with alcohol.

*Example 3*

An emulsion was prepared by mixing 15 parts of 2-vinylthiophene and 5 parts of 1,3-butadiene with 100 parts of water containing 2 parts of sodium oleate and 0.1 part of benzoyl peroxide. The emulsion was maintained at a temperature between about 120° and 125° F. for 88 hours at autogenous pressure. To the resultant synthetic latex was added 0.5 part of phenyl-beta-naphthylamine. Precipitation of the synthetic latex by the addition of acid yielded a rubbery coagulum which was dissolved in benzene and reprecipitated with alcohol. The yield of synthetic rubber was 18 parts, representing 90% of the theoretical yield.

Surprising is the fact that rubber-like products can be produced by co-polymerization of a large proportion of a vinylthiophene with a relatively small proportion of a diolefin. Since the copolymerization product in this case has a relatively low unsaturation as compared with natural rubber and most synthetic rubber-like materials, it might be expected to behave as a resinous or thermoplastic material rather than a rubber-like substance. In accordance with my discovery, therefore, it is possible to produce rubber-like materials having controlled unsaturation varying over a wide range by varying the relative proportions of the vinylthiophene and diolefinic comonomer subjected to conjoint polymerization. This control of the extent of unsaturation of the rubber-like product is of great value, since the extent of unsaturation is, in large measure, determinative of the behavior of the rubber-like material in vulcanization processes and of the properties obtained on vulcanization. Increased ease of vulcanization of my products may also be attributable, to some extent, to the sulfur present in the vinylthiophene.

*Example 4*

An emulsion was prepared by mixing 37 parts of 2-vinylthiophene and 13 parts of 1,3-butadiene with 90 parts of water containing 10 parts of sodium oleate, 0.2 part of sodium peroxide and, as a polymerization regulator, 0.2 part of ethyl mercaptan. A complete and stable emulsion was produced. Copolymerization was allowed to proceed for 91 hours at a temperature between about 120° and 125° F. Following copolymerization 1.5 parts of phenyl-beta-naphthylamine were added and the synthetic latex was precipitated by adding acetic acid and alcohol. The resultant rubber-like coagulum was washed with water, dissolved in benzene and reprecipitated from benzene solution by the addition of alcohol to yield 46 parts of a product resembling crepe rubber.

Example 4, like Example 3, demonstrates the surprising discovery that rubber-like, rather than plastic, materials can be produced by copolymerizing a large proportion of a vinylthiophene with a relatively small proportion of a diolefin.

I have also found that a vinylthiophene can be polymerized with a plurality of unsaturated compounds conventionally used for the manufacture of synthetic rubber e. g., butadiene and styrene or butadiene and acrylonitrile, rendering possible a reduction in the proportion of one of the compounds, e. g. butadiene, styrene or acrylonitrile. Likewise, divinylthiophenes can be used in place of part or all of the monovinylthiophenes in the copolymerization reactions of my invention. Similarly, nuclear substituted vinylthiophenes, e. g. nuclear halogenated vinylthiophenes can be used for the purposes of my invention.

Depending on the specific combination of vinylthiophene and comonomers in the feed stock and the polymerization catalyst and conditions, a wide variety of high polymeric materials having properties ranging from those commonly associated with plastic materials to those ordinarily associated with rubber or rubber-like material can be produced by the process of my invention. These materials can be subjected to the aftertreatments which are conventional in the plastics and rubber arts, respectively.

Thus, rubber-like materials produced by the process of my invention can be compounded with softeners, plasticizers, elasticators, extenders, tackifiers, antioxidants, heat sensitizers, fillers, reinforcing agents, pigments, fabrics, vulcanization accelerators, etc. They can also be subjected to conventional processing, such as milling, kneading, vulcanization, hot air plasticization, etc.

Plastic materials produced by the process of my invention can be compounded with softeners, plasticizers, elasticators, anti-oxidants, fillers, pigments, etc. They can also be elasticized by treatment with vulcanizable plasticizers, by which I mean a treatment of the type described by B. S. Garvey et al. in the Journal of Industrial and Engineering Chemistry 33, 1060 (1941). Thus, I can obtain a rubber-like material either by copolymerizing a mixture of a vinylthiophene, a butadiene and styrene or by copolymerizing a vinylthiophene and styrene and polymerizing a butadiene in the presence of the copolymer.

The terms polymerization, copolymerization and conjoint polymerization as used throughout the above description of my process are intended to include not only the strictly polymerizing reactions effected in the designated feed stocks over polymerization catalysts, but also such concurrent reactions as may occur. Thus, it is well known that polymerization may be attended by secondary reactions such as isomerization, cracking, hydrogen exchange reactions, dehydration, etc. In my description I use the term polymerization broadly to mean any reaction resulting in the production of a product of substantially higher average molecular weight from one or more feed stocks of lower molecular weight.

I claim:

1. The process for producing a solid, rubber-like copolymer which comprises emulsifying 2-vinylthiophene and a diolefinic compound in an aqueous medium containing an emulsifying agent and an oxygen-disengaging polymerization catalyst, the vinylthiophene constituting between 5 and 90% of the reacting ingredients, subjecting the resultant emulsion to a temperature between about 50° F. and about 200° F. and pressure sufficient to maintain the liquid phase, and separating a solid, rubber-like copolymer from said emulsion.

2. The process of claim 1 wherein the diolefinic compound is a diolefinic hydrocarbon.

3. The process of claim 1 wherein the diolefinic compound is 1,3-butadiene.

4. A copolymer of a vinylthiophene and a diolefinic compound, said copolymer containing at least 5% but not more than 90% of a vinylthiophene.

5. A copolymer of a vinylthiophene and a diolefinic hydrocarbon, said copolymer containing at least 5% but not more than 90% of a vinylthiophene.

6. A copolymer of a vinylthiophene and a conjugated diolefinic hydrocarbon, said copolymer containing at least 5% but not more than 90% of a vinylthiophene.

7. A copolymer of a vinylthiophene and 1,3-butadiene, said copolymer containing at least 5% but not more than 90% of a vinylthiophene.

8. The copolymer of claim 5 wherein the vinylthiophene is 2-vinylthiophene.

9. The copolymer of claim 6 wherein the vinylthiophene is 2-vinylthiophene.

10. The copolymer of claim 7 wherein the vinylthiophene is 2-vinylthiophene.

11. The process for producing a solid, rubber-like copolymer which comprises emulsifying a vinylthiophene and a diolefinic compound in an immiscible, inert liquid containing an emulsifying agent and an oxygen-disengaging polymerization catalyst, the vinylthiophene constituting between 5 and 90% of the reacting ingredients, subjecting the resultant emulsion to a temperature between about 50° F. and about 200° F. and a pressure sufficient to maintain the liquid phase, and separating a solid, rubber-like copolymer from said emulsion.

12. The process of claim 11 wherein the vinylthiophene is 2-vinylthiophene.

13. The process of claim 11 wherein the vinylthiophene is 2-vinylthiophene and the diolefinic compound is a conjugated diolefinic hydrocarbon.

14. The process of claim 11 wherein the vinylthiophene is 2-vinylthiophene and the diolefinic compound is 1,3-butadiene.

15. The process for producing a solid, rubber-like copolymer which comprises emulsifying a vinylthiophene and diolefinic compound in an immiscible, inert liquid containing an emulsifying agent and a peroxide polymerization catalyst, the vinylthiophene constituting between 5 and 90% of the reacting ingredients, subjecting the resultant emulsion to a temperature between about 50° F. and about 200° F. and a pressure sufficient to maintain the liquid phase, and separating a solid, rubber-like copolymer from said emulsion.

16. A process for producing a solid, rubber-like, highly benzene-soluble copolymer, which process comprises emulsifying 25 parts by weight of 2-vinylthiophene and 75 parts by weight of butadiene in an aqueous medium containing an emulsifying agent and an oxygen-disengaging polymerization catalyst, subjecting the resultant emulsion to a temperature between 120° F. and 125° F. under a pressure sufficient at least to maintain the liquid phase, for a period of time sufficient to effect substantial copolymerization, and separating the resultant rubber-like copolymer from said emulsion.

17. The process for producing a solid, rubber-like copolymer which comprises emulsifying 2-vinylthiophene and a conjugated diolefinic hydrocarbon in an immiscible, inert liquid containing an emulsifying agent and a peroxide polymerization catalyst, said vinylthiophene constituting between 5 and 90% of the reacting ingredients, subjecting the resultant emulsion to a temperature between about 50° F. and about 200° F. and a pressure sufficient to maintain the liquid phase, and separating a solid, rubber-like copolymer from said emulsion.

18. A rubber-like copolymer of 2-vinylthiophene and 1,3-butadiene, said copolymer containing about 75 weight percent of butadiene and about 25 weight percent of 2-vinylthiophene.

19. A rubbery copolymer of a vinylthiophene and a conjugated diolefinic hydrocarbon, said copolymer containing at least 5% of a vinylthiophene.

20. A rubbery copolymer of a vinylthiophene and 1,3-butadiene, said copolymer containing at least 5% of a vinylthiophene.

21. A rubbery copolymer of 2-vinylthiophene and a conjugated diolefinic hydrocarbon, said copolymer containing at least 5% of 2-vinylthiophene.

22. A rubbery copolymer of 2-vinylthiophene and 1,3-butadiene, said copolymer containing at least 5% of 2-vinylthiophene.

EDGAR C. PITZER.

REFERENCES CITED

The following references are of record in the file of this patent:

FOREIGN PATENTS

| Number | Country | Date |
| --- | --- | --- |
| 487,604 | Great Britain | June 22, 1938 |

OTHER REFERENCES

Morrell: "Synthetic Resins," 2nd edition, page 193, published by Oxford, London, 1943.

Krczil: "Kurzes Handbuch der Polymerisationstechnick," Bd. 1, page 320 (1940), Becker and Erler, Leipzig.

Kuhn et al.: Article in Annalen der Chemie, Band 547, Heft 3, pages 293–299, June 18, 1941.

Annalen, vol. 547, pages 293–9, for 1941, abstracted in Chem. Abstracts, vol. 26, page 6535.